United States Patent [19]

Kuno

[11] Patent Number: 4,762,660
[45] Date of Patent: Aug. 9, 1988

[54] COIL ARRANGEMENT FOR NUCLEAR FUSION APPARATUS

[75] Inventor: Kazuo Kuno, Kobe, Japan

[73] Assignee: Mitsubishi Denki Kabushiki Kaisha, Japan

[21] Appl. No.: 868,043

[22] Filed: May 29, 1986

[51] Int. Cl.4 .................................................. G21B 1/00
[52] U.S. Cl. ...................................... 376/142; 174/32
[58] Field of Search ........................ 376/142; 174/32; 307/89

[56] References Cited

U.S. PATENT DOCUMENTS 3,461,218 8/1969 Buchhold ............................. 174/32
3,609,208 9/1971 Winpisinger ......................... 174/32

FOREIGN PATENT DOCUMENTS 59-7287 1/1984 Japan .
59-128478 7/1984 Japan .................................. 376/142

Primary Examiner—Deborah L. Kyle
Assistant Examiner—Richard L. Klein
Attorney, Agent, or Firm—Leydig, Voit & Mayer

[57] ABSTRACT

A coil arrangement for a nuclear fusion apparatus comprises a return conductor radially penetrating through a coil at a portion having a transition between turns and a feed conductor symmetrically arranged with regard to the axis of the return conductor. The coil arrangement practically reduces current loops generated by the transition current, thereby practically reducing the generation of the error magnetic fields and, therefore, better confining the plasma.

3 Claims, 5 Drawing Sheets

TRANSITION BETWEEN LAYERS

FIG. 10
FIG. 11
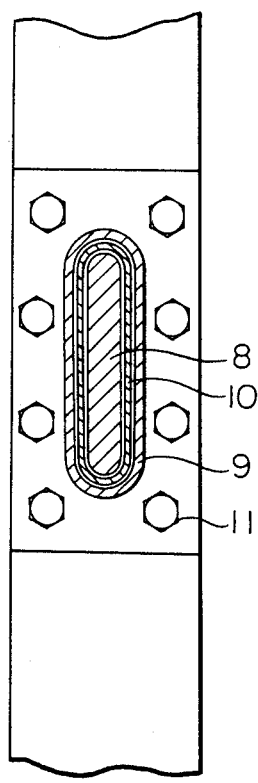
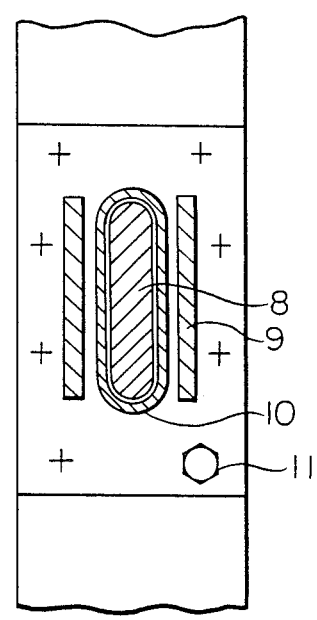

COIL ARRANGEMENT FOR NUCLEAR FUSION APPARATUS

BACKGROUND OF THE INVENTION

The present invention relates to a coil arrangement for a nuclear fusion apparatus and more particularly to a transition-feeding structure for the coil arrangement for a nuclear fusion apparatus.

A prior art coil arrangement for a nuclear fusion apparatus is constructed as shown in FIGS. 1 and 2. FIG. 3 is a schematic view showing the flow of the coil current of the coil shown in FIG. 1., the solid line showing the current flowing in the upper coil layer and the dot line showing the current flowing in the lower coil layer. FIG. 4 is a schematic view showing current loops of error magnetic fields causing error magnetic fields namely showing only the current remaining after the elimination of ideal circular current among the currents flowing in the coil of FIG. 3.

Referring now to FIGS. 1 and 2, reference numeral 1 designates a coil conductor, numeral 2 a transition conductor between turns, numeral 3 a transition conductor between layers and numeral 4 a feeder line.

A current flows through the coil conductor 1, but when the current flows in the transition conductor between turns 2, transition conductor between layers 3 and the feeder line 4, additional current components other than the current which flows through the coil conductor 1 are generated since they are deviated from the round shape of the coil as shown in FIGS. 3 and 4. The additional current components generate error magnetic fields which are disadvantageous in that they effect the confinement of plasma within the coil. It is clear that the smaller the loop areas of the additional currents are, the smaller the error magnetic fields become. It has been therefore conceived that the transition structure be changed.

FIG. 5 is a schematic view showing the mode of transition of the current flowing through the coil disclosed in Japanese Patent application laid open No. 59-7287 published on Jan. 14, 1984 "A nuclear fusion apparatus", Applicant: Hitachi Seisakusho K. K. In the fig. reference numeral 5 designates arrows indicating the direction of the current flowing through the coil, numeral 6 a transition current between coil layers, numeral 7 a transition current between coils, and numeral 8 a return conductor. As can be seen from Fig. the transition directions are reversed to each other as indicated by the arrows 6, so as to minimize the error magnetic fields in the inner side of the coil in the vicinity of the plasma (not shown).

However, even with the prior art technic as shown in FIG. 5, there exists the possibility of the problem that current loops may remain and generate the error magnetic fields, since the error magnetic fields may not be cancelled out sufficiently. Furthermore, there exists the problem in the production of the coil due to the fact that the mode of transition between coil layers is complicated.

SUMMARY OF THE INVENTION

The present invention has been made in view of the problem as stated above and has for its object to provide a coil arrangement for a nuclear fusion apparatus in which current loop areas generated by transition current are practically reduced to substantially minimize the error magnetic fields, thereby making it possible to obtain a coil arrangement for a nuclear fusion apparatus in which characteristics of the plasma confinement are improved.

The coil arrangement for a nuclear fusion apparatus according to the present invention is characterized by a return conductor penetrating through the coil at a portion having a transition between turns and a feed conductor symmetrically arranged with regard to the axis of the return conductor The feeding structure in the present invention reduces current loops generated by the transition current, thereby practically reducing the generation of the error magnetic fields, and, therefore better confining the plasma.

BRIEF DESCRIPTION OF THE DRAWINGS

FIG. 10 is a partial side view of another embodiment of the feeding portion of the coil arrangement of FIG. 6;

FIG. 11 is a partial side view of the same portion of FIG. 7 according to other embodiment of the present invention.

In the attached drawings, the same reference numerals denote the same and corresponding portions.

DESCRIPTION OF THE PREFERRED EMBODIMENTS

The present invention will be more readily clear from the following description in which the preferred embodiments have been set forth in reference with the accompanying drawings.

Figures 6, 7:
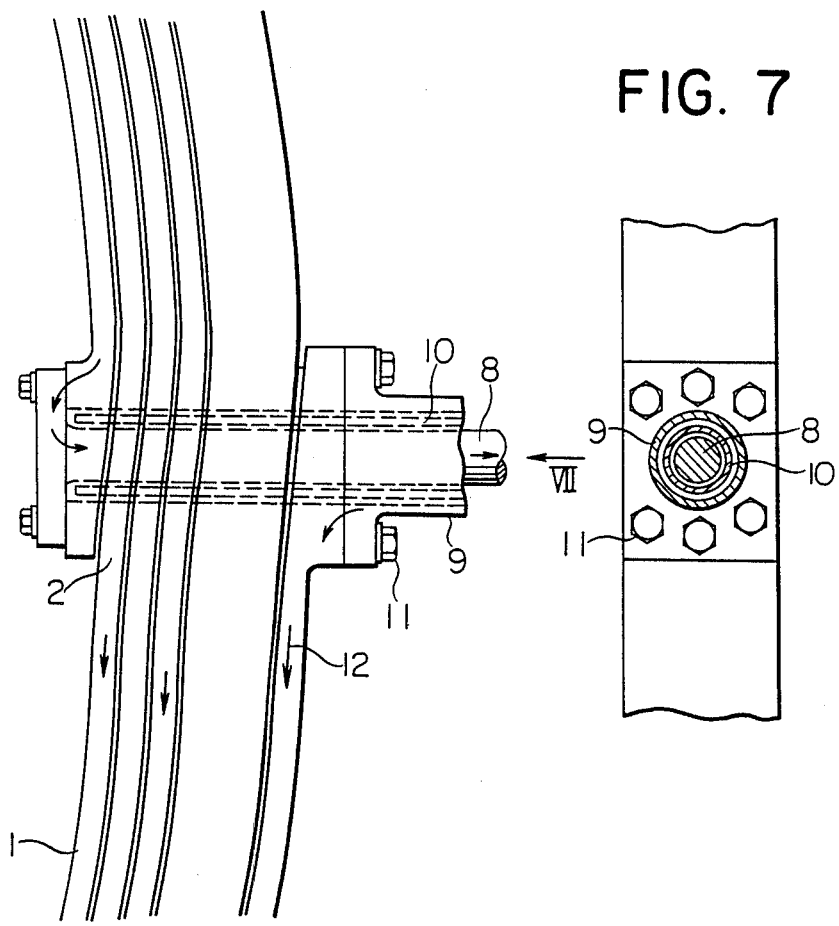
FIG. 6 is a partial plan view of a coil arrangement for a nuclear fusion apparatus of one embodiment according to the present invention, namely showing a transition between turns and a feeding portion of the coil arrangement.
FIG. 7 is a partial side of the coil arrangement taken from the arrow VII of FIG. 6.
Figure 8:
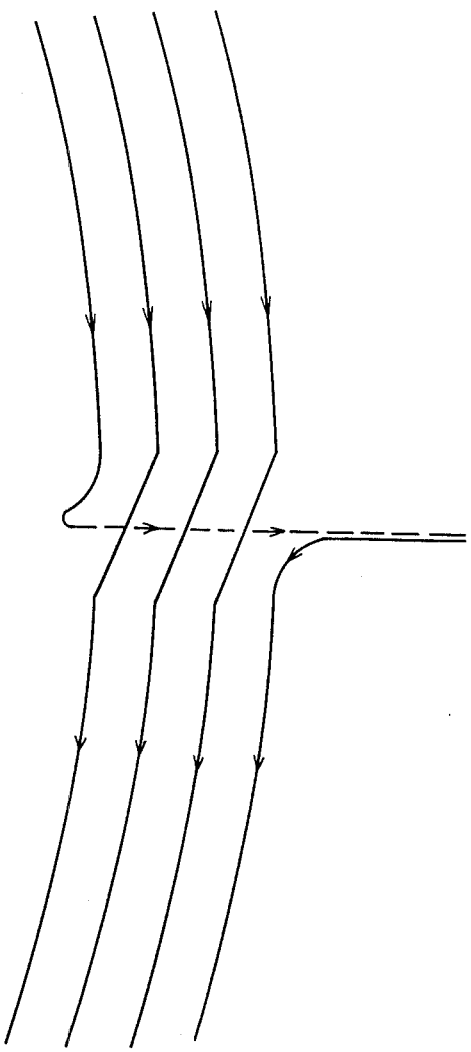
FIG. 8 is a schematic view showing the flow of the coil current flowing in the coil arrangement of FIG. 6.
Figure 9:
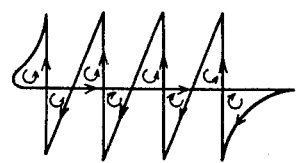
FIG. 9 is a schematic view of the current loops in error magnetic fields remaining after the elimination of an ideal current flowing in the coil of FIG. 6.

FIG. 6 is a partial plan view showing one embodiment of a coil arrangement for a nuclear fusion apparatus according to the present invention, FIG. 7 is a partial side view taken from the arrow VII of FIG. 6, FIG. 8 is a schematic view showing the flow of the current flowing in the coil of FIG. 6 and FIG. 9 is a schematic view showing current loops in the error magnetic fields remaining after the elimination of ideal circular current among the currents flowing in the coil of FIG. 6.

Figure 1:
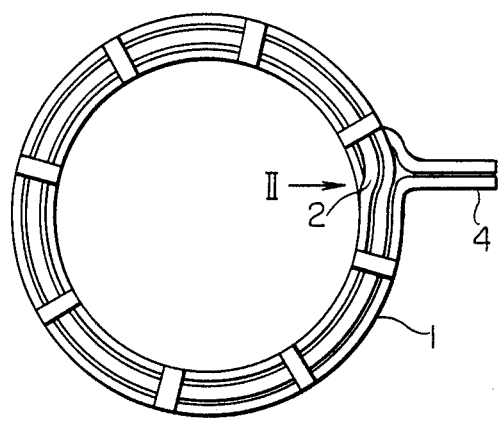
FIG. 1 is a plan view of one embodiment of a prior art coil arrangement for a nuclear fusion apparatus.
Figure 2:
FIG. 2 is a partial side view of the coil arrangement taken from the arrow II of FIG. 1.

As shown in FIGS. 6 to 9, the coil conductor 1 and the transition conductor between turns 2 are constructed in the substantially same manner as that shown in FIG. 1, but the return conductor 8 of the feeder line radially penetrates through the coil at a portion of the transition between turns situated on the transition conductor between turns 2, and the feed conductor 9 is coaxially arranged in a symmetrical relation with regard to the axis of the return conductor 8 and the feed conductor 9 is arranged so as to surround the return conductor 8 in the embodiment as shown in FIG. 7. Reference numeral 10 designates an insulation between the return conductor 8 and the feed conductor 9, numeral 11 bolts for fixing both the conductors 8 and 9, numeral 12 arrows showing the direction of the current.

Due to the construction as stated above, the position of the current flowing in the direction of the transition between turns through the transition conductor between turns 2 and the position of the return current flowing through the return conductor 8 are almost coincident with each other, so that the error magnetic fields generated by the transition current cancel out each other, whereby the resultant error is considerably reduced. In the above embodiment, it is possible to make smaller the error magnetic fields generated in a single layer coil and even in case that a plurality of single layer coils are only stacked, it is possible for the stacked multi layer coil arrangements to further provide an advantageous effect due to mutual cancellation of the error magnetic fields. The position of leading out wires may be shifted and holes formed on the coil vessel through which the leading out wires are lead out can be shifted, thereby resulting in a reduction in dimention of each of the holes and also making it possible to avoid constructural defect of the coil vessel accordingly.

FIG. 7 shows one embodiment in which the return conductor and the feed conductor of the feeder line are coaxially adapted in the round section but, as shown in FIG. 10, the return conductor and the feed conductor of the feeder line are elongated in the section thereof in the circumferencial direction of the coil. Due to the elongated shape, the width of conductors can be reduced, whereby preventing the strength thereof from reducing. Further, the coaxial structure is not completely roundshaped, but shaped such that, as shown in FIG. 11, the return conductor 8 is sandwiched by feed conductors 9. After the holes through which the return conductor penetrates through the coil is beforehand machined in the coil condcutor, the coil may be formed or the holes may be machined after the coil has been manufactured. The direction of the current as shown in FIG. 1 may be naturally reversed.

Figure 3:
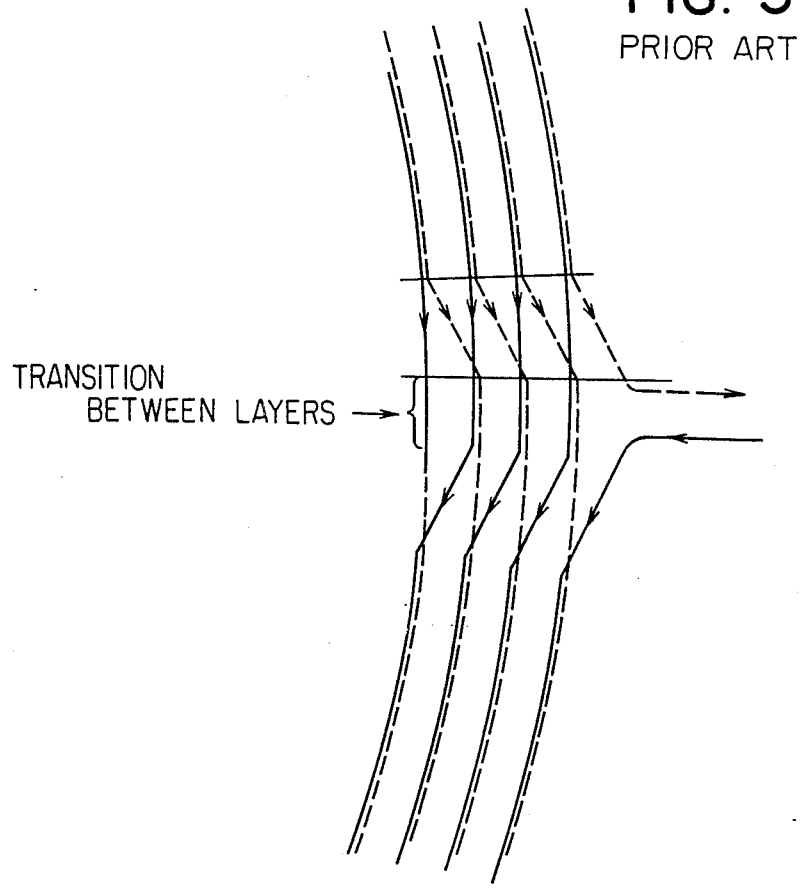
FIG. 3 is a schematic view showing the flow of the coil current of FIG. 1.
Figure 4:
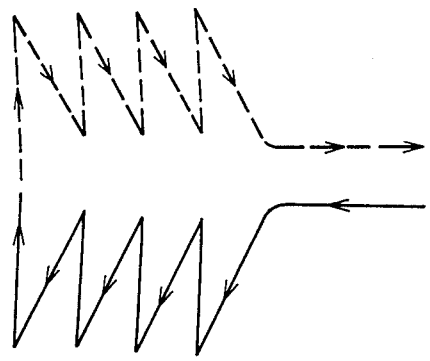
FIG. 4 is a schematic view showing current loops in error magnetic fields causing the error magnetic fields.
Figure 5:
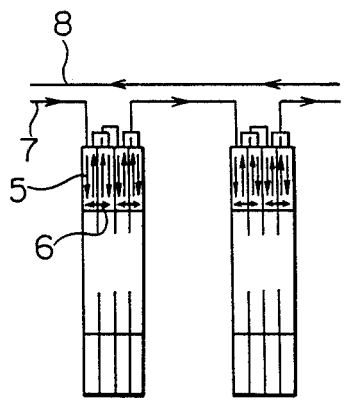
FIG. 5 is a sectional view showing another embodiment of an prior art coil arrangement for a nuclear fusion apparatus.

The generated error magnetic fields are substantially proportional to the area formed by the current loops. The area of the current loops shown in FIG. 4 is large, while the area formed by the current loops shown in FIG. 9 is small and in addition, the current loops are both in the clockwise and counter-clockwise directions so that the error magnetic fields generated by these opposed current loops cancel out each other. The error magnetic fields produced in the coil shown in FIG. 6 can be very smaller than those of the coil shown in FIG. 1. In the coil arrangement shown in FIG. 1, it is difficult to make the current loops smaller because of the configulation of the transitions between layers 3 as shown in FIGS. 3 and 4. Even if the coil is wound as shown in FIG. 5, it is difficult to prevent the error magnetic fields from generating.

Thus, according to the present invention, there is provided a return conductor which penetrates through the coil at a portion of the transition between turns, the coil is constructed such that the return conductor and the going conductor are coaxially arranged, thereby reducing the resultant error magnetic fields and making it possible to provide a coil arrangement in which the characteristics of the plasma confinement are improved.

What is claimed is:

1. In a nuclear fusion apparatus, a coil arrangement comprising a coil including a portion having a transition between turns, a return conductor radially penetrating through the transition portion of the coil, and feed conductor means symmetrically arranged with regard to the axis of the return conductor.

2. A coil arrangement for a nuclear fusion apparatus according to claim 1 wherein the return conductor and the feed conductor means are elongated in the circumferencial direction of the coil arrangement.

3. A coil arrangement for nuclear fusion apparatus according to claim 1 wherein the feed conductor means includes a plurality of feed conductors and the return conductor is arranged so as to be sandwiched by the feed conductors.

* * * * *